C(12) United States Patent
Diep et al.

(10) Patent No.: US 7,102,812 B2
(45) Date of Patent: Sep. 5, 2006

(54) DEVICES AND METHODS FOR RAMAN AMPLIFICATION AND DISPERSION COMPENSATION

(75) Inventors: Phong Diep, Horseheads, NY (US); James C. Fajardo, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 298 days.

(21) Appl. No.: 10/659,523

(22) Filed: Sep. 9, 2003

(65) Prior Publication Data

US 2004/0070818 A1   Apr. 15, 2004

Related U.S. Application Data

(60) Provisional application No. 60/418,448, filed on Oct. 15, 2002.

(51) Int. Cl.
*H04B 10/12* (2006.01)
(52) U.S. Cl. ............ 359/337.5; 359/334; 398/148
(58) Field of Classification Search ............ 359/337.5, 359/334; 398/148
See application file for complete search history.

(56) References Cited

U.S. PATENT DOCUMENTS

| 5,799,123 | A | 8/1998 | Oyobe et al. ............... 385/124 |
| 6,263,139 | B1* | 7/2001 | Kawakami et al. ......... 385/123 |
| 6,307,984 | B1* | 10/2001 | Watanabe ................... 385/24 |
| 6,404,964 | B1* | 6/2002 | Bhagavatula et al. ....... 385/123 |
| 6,640,031 | B1* | 10/2003 | Dong et al. .................. 385/39 |
| 6,650,814 | B1* | 11/2003 | Caplen et al. .............. 385/127 |
| 6,731,848 | B1* | 5/2004 | Jiang et al. ................. 385/127 |
| 6,751,390 | B1* | 6/2004 | Qi et al. ..................... 385/127 |
| 6,757,468 | B1* | 6/2004 | Bickham et al. ............ 385/127 |
| 6,768,852 | B1* | 7/2004 | Zhang ........................ 385/127 |
| 6,807,351 | B1* | 10/2004 | Hebgen et al. ............. 385/127 |
| 6,888,993 | B1* | 5/2005 | Zhang ........................ 385/127 |

(Continued)

FOREIGN PATENT DOCUMENTS

EP   1 083 446 A1   3/2001

(Continued)

OTHER PUBLICATIONS

Mohammed N. Islam. Raman Amplifiers for Telecommunications. IEEE Journal of Selected Topics in Quantum Electronics, vol. 8, No. 3, May/Jun. 2002. pp. 548-559.*

(Continued)

*Primary Examiner*—Jack Keith
*Assistant Examiner*—Ari M Diacou
(74) *Attorney, Agent, or Firm*—Suetlana Z. Short

(57) ABSTRACT

The present invention provides devices and methods for Raman amplification and dispersion compensation. According to one embodiment of the present invention, a dispersion compensating device includes a dispersion compensating fiber having a dispersion more negative than about −50 ps/nm/km over a wavelength range of about 1555 nm to about 1615 nm; a Raman gain fiber having a dispersion more positive than about −40 ps/nm/km over a wavelength range of about 1555 nm to about 1615 nm; and a pump source operatively coupled to the dispersion compensating fiber and the Raman gain fiber, the pump source operating at a pump wavelength, wherein the dispersion compensating fiber has a Raman Figure of Merit at the pump wavelength, and wherein the Raman gain fiber has a Raman Figure of Merit at least about equivalent to the Raman Figure of Merit of the dispersion compensating fiber, and wherein the dispersion compensating fiber and the Raman gain fiber are arranged in series between the input and the output of the device. The device provides higher Raman gain than a conventional Raman-pumped dispersion compensating device.

15 Claims, 4 Drawing Sheets

U.S. PATENT DOCUMENTS

| | | | |
|---|---|---|---|
| 6,961,500 B1* | 11/2005 | Zhang | 385/123 |
| 6,975,801 B1* | 12/2005 | Bickham | 385/124 |
| 6,985,662 B1* | 1/2006 | Bickham | 385/127 |
| 6,987,918 B1* | 1/2006 | Bickham | 385/127 |
| 2001/0021291 A1* | 9/2001 | Miyakawa et al. | 385/27 |
| 2001/0051031 A1* | 12/2001 | Hada et al. | 385/123 |
| 2002/0041736 A1* | 4/2002 | LoCasclo et al. | 385/39 |
| 2002/0118934 A1* | 8/2002 | Danziger et al. | 385/122 |
| 2002/0131132 A1* | 9/2002 | Tanaka et al. | 359/179 |

FOREIGN PATENT DOCUMENTS

| | | |
|---|---|---|
| EP | 1170 604 A | 1/2002 |
| EP | 1 195 627 A2 | 4/2002 |
| WO | WO 03/055017 A1 * | 12/2001 |
| WO | WO 02/19576 | 3/2002 |
| WO | WO02/058198 A | 7/2002 |
| WO | WO02075934 | 9/2002 |

OTHER PUBLICATIONS

Antos, et al. "Design and Characterization of Dispersion Compensating Fiber Based on the $LP_{01}$ Mode", Journal of LIghtwave Technology, vol. 12, No. 10, Oct. 1994, p. 1739-1745.

* cited by examiner

DEVICES AND METHODS FOR RAMAN AMPLIFICATION AND DISPERSION COMPENSATION

CROSS-REFERENCE TO RELATED APPLICATIONS

This application claims the benefit of priority of U.S. Provisional Application Ser. No. 60/418,448 filed on Oct. 15, 2002, which is incorporated by reference herein in its entirety.

BACKGROUND OF THE INVENTION

1. Field of the Invention

The present invention relates generally to optical communications, and more specifically to devices and methods providing dispersion compensation and Raman amplification of an optical signal.

2. Technical Background

As the bit rates of optical communications systems increase, the deleterious effects of dispersion in the optical fibers used in long-distance transmission become increasingly important. Dispersion causes optical pulses to spread out in time; the lower wavelength components of the pulse travel along the fiber at a different rate than do the higher wavelength components of the pulse. Typically, long-distance transmission fibers (e.g. LEAF®, available from Corning Incorporated of Corning, N.Y.) have a small but non-negligible positive dispersion, causing the higher wavelength components to arrive at a network node before the lower wavelength components. This temporal spreading can cause loss of signal fidelity and an increase in bit error rate.

Conventional methods of dispersion compensation use dispersion compensating fiber to reverse the effects of dispersion in the transmission fiber. Dispersion compensating fiber typically has a large negative dispersion to counteract the positive dispersion of the transmission fiber. In one type of conventional dispersion compensating device, a dispersion compensating fiber is packaged on a spool in a module. The length and dispersion properties of the dispersion compensating fiber are chosen to balance the dispersion of the span of transmission fiber to which it is coupled. A positively chirped optical signal from the transmission fiber is propagated through the dispersion compensating fiber, and the negative dispersion of the dispersion compensating fiber removes the positive chirp from the optical signal.

Stimulated Raman scattering is a well-known nonlinear phenomenon that can allow many conventional optical fibers to provide broadband amplification. A weak signal in the 1550–1620 nm wavelength range can be amplified by propagation in an optical fiber with strong pump radiation (typically in the 1430–1480 nm wavelength range). The higher energy pump radiation scatters off atoms in the optical fiber core, loses some energy to those atoms, and propagates down the fiber with the same wavelength as the signal. The amount of amplification provided by stimulated Raman scattering in an optical fiber is proportional to the Raman scattering coefficient of the material of the optical fiber core, and is inversely proportional to the product of the fiber's effective area and its absorption loss. One conventional method to achieve signal amplification in a dispersion compensating device is to directly pump the dispersion compensating fiber. Typical dispersion compensating fibers are effective Raman gain media due to their nonlinear nature and small effective area.

Raman pumping of the dispersion compensation fiber is not always sufficient to provide a desired amount of gain. For example, dispersion compensating devices designed to compensate for relatively short spans of transmission fiber have relatively short lengths of dispersion compensating fiber. The short length of the dispersion compensating fiber in such devices limits the amount of Raman gain that can be achieved.

SUMMARY OF THE INVENTION

One aspect of the present invention relates to a dispersion compensating device having an input and an output, the device including a dispersion compensating fiber having a dispersion more negative than about −50 ps/nm/km over a wavelength range of about 1555 nm to about 1615 nm; a Raman gain fiber having a dispersion more positive than about −40 ps/nm/km over a wavelength range of about 1555 nm to about 1615 nm; and a pump source operatively coupled to the dispersion compensating fiber and the Raman gain fiber, the pump source operating at a pump wavelength, wherein the dispersion compensating fiber has a Raman Figure of Merit at the pump wavelength, and wherein the Raman gain fiber has a Raman Figure of Merit at least about equivalent to the Raman Figure of Merit of the dispersion compensating fiber, and wherein the dispersion compensating fiber and the Raman gain fiber are arranged in series between the input and the output of the device.

Another aspect of the present invention relates to a method of amplifying and dispersion-compensating an input optical signal, the optical signal being propagated from a length of transmission fiber, the optical signal having an intensity and a positive chirp, the method yielding an output optical signal, the method including the steps of propagating the optical signal and a pump wave through a dispersion compensating fiber having a dispersion more negative than about −50 ps/nm/km over a wavelength range of about 1555 nm to about 1615 nm, and a Raman Figure of Merit; and propagating the optical signal and a pump wave through a Raman gain fiber having a Raman Figure of Merit at least about equivalent than the Raman Figure of Merit of the dispersion compensating fiber, and a dispersion of more positive than about −40 ps/nm/km over a wavelength range of about 1555 nm to about 1615 nm.

Another aspect of the present invention relates to a Raman amplification device having an input and an output, the device including a Raman gain fiber having a profile selected to provide a dispersion of between about −25 ps/nm/km and about −15 ps/nm/km at a wavelength of 1450 nm and a dispersion slope of between about 0 ps/nm²/km and about 0.05 ps/nm²/km at a wavelength of 1450 nm; and a pump source operatively coupled to the Raman gain fiber.

Another aspect of the present invention relates to a Raman amplification device having an input and an output, the device including a Raman gain fiber having a germania-doped core having an index profile having an a of between about 1.5 and about 2.5 and a radius of between about 1.8 µm and about 2.4 µm, a cladding, and a core-to-cladding Δ of at least about 1.8%; and a pump source operatively coupled to the Raman gain fiber.

The devices and methods of the present invention result in a number of advantages over prior art devices and methods. For example, the present invention provides a Raman-pumped dispersion compensating device that can simultaneously provide a desired amount of dispersion compensation and a desired amount of gain.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DEFINITIONS

The following definitions are in accord with common usage in the art.

The refractive index profile is the relationship between refractive index and optical fiber radius.

Delta, $\Delta$, is the relative refractive index percent, $\Delta=(n_i^2-n_c^2)/2n_c^2$, where $n_i$ is the specified refractive index in region i, and $n_c$ is the average refractive index of the cladding region. Deltas are conventionally expressed as percents.

The term $\alpha$-profile refers to a refractive index profile, expressed in terms of $\Delta(b)$, where b is radius, which follows the equation $$\Delta(b)=\Delta(b_0)(1-[|b-b_0|/(b_1-b_0)]^\alpha)$$

where $b_0$ is the point at which $\Delta(b)$ is maximum, $b_1$ is the point at which $\Delta(b)\%$ is zero, and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number.

DETAILED DESCRIPTION OF THE PREFERRED EMBODIMENTS

Figure 1:
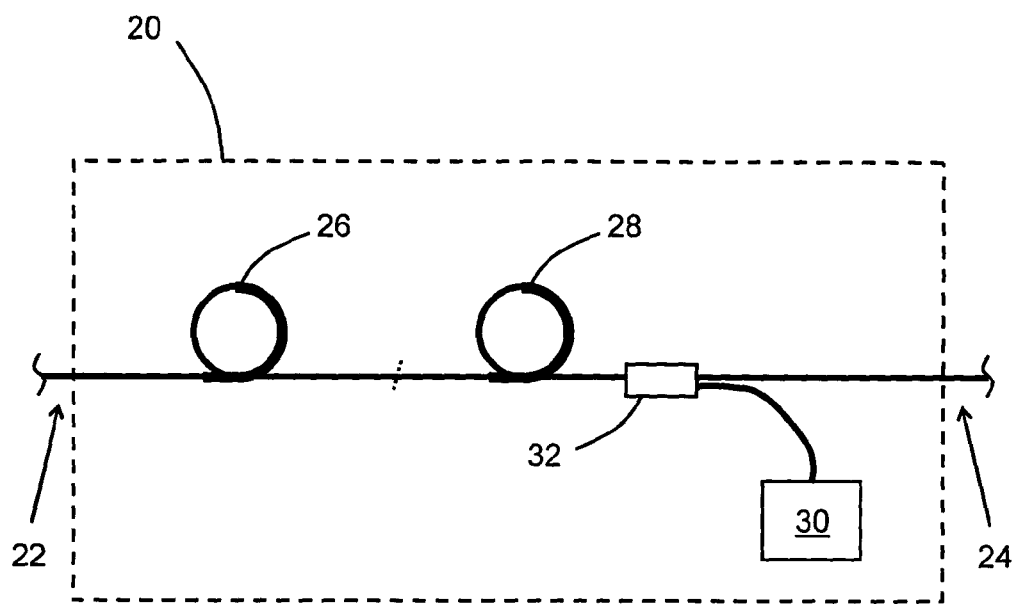
FIG. 1 is a schematic view of a dispersion compensating device according to one embodiment of the present invention.

One aspect of the present invention relates to a dispersion compensating device including a dispersion compensating fiber, a trim fiber, and a Raman gain fiber. As used herein, a dispersion compensating device may provide dispersion compensation at a single wavelength, or at a plurality of wavelengths (e.g. broadband or dispersion slope compensation.) An embodiment of the present invention is shown in schematic view in FIG. 1. A dispersion compensating device 20 has an input 22 and an output 24. A dispersion compensating fiber 26 and a Raman gain fiber 28 are arranged in series between the input and the output. A pump source 30 is coupled to the Raman gain fiber through a WDM coupler 32. In this configuration, the pump source 30 is configured so that it provides a counterpropagating pump signal 34. The pump source operates at a pump wavelength (e.g. 1457 nm), and may be, for example, a pump laser. As the pump signal propagates through the Raman gain fiber 28 and into the dispersion compensating fiber 26, the pump source 30 may be said to be operatively coupled to both the Raman gain fiber and the dispersion compensating fiber.

The dispersion compensating fiber 26 has a dispersion of more negative than about −50 ps/nm/km over a wavelength range of about 1555 nm to about 1615 nm. In certain embodiments of the invention, the dispersion compensating fiber 26 may have a dispersion slope more negative than −1.5 ps/nm²/km at 1575 nm. The Raman gain fiber has a dispersion more positive than about −40 ps/nm/km over a wavelength range of about 1555 nm to about 1615 nm.

The Raman gain fiber has a Raman Figure of Merit at least about equivalent to the Raman Figure of Merit of the dispersion compensating fiber at the pump wavelength. The Raman Figure of Merit is defined by the equation $$\text{Raman Figure of Merit} = \frac{g_R}{A_{\text{eff}} \cdot Att'n},$$

where $g_R$ is the Raman scattering coefficient of the material of the core of the optical fiber, Aeff is the effective area of the fiber at the pump wavelength, and Att'n is the attenuation of the fiber at the pump wavelength in units of km⁻¹. The value of $g_R$ relates to the probability of a photon being scattered in a Raman process, and is strongly dependent on the composition of the material; increasing the germania content of a material tends to increase its $g_R$. The attenuation in units of km⁻¹ may be calculated by dividing the attenuation in dB/km by $10\log_{10}(e)$ (about 4.34). The Raman Figure of Merit for an optical fiber may be determined from the equation describing the signal gain in a Raman-pumped optical fiber:

$$G = \exp\left(\frac{g_R \cdot P}{A_{\text{eff}} \cdot Att'n}(1-\exp(-Att'n \cdot L))\right)$$

where G is the signal gain, $g_R$, $A_{\text{eff}}$ and Att'n are as described above, P is the Raman pump power launched into the fiber, and L is the length of the fiber. The skilled artisan may measure the signal gain for a given Raman pump power in a length of fiber and manipulate the equations given above to determine the Raman Figure of Merit. Such procedures are described by Gray in "Raman Gain Measurements in Optical Fibers," *Technical Digest: Symposium on Optical Fiber Measurements* 2000, NIST Special Publication 953, at page 151, which is incorporated herein by reference in its entirety. Dispersion compensating fibers typically used to compensate the dispersion of LEAF® have Raman Figures of merit greater than about 10 $W^{-1}$ (e.g. 15 $W^{-1}$). In desirable embodiments of the invention, the Raman Figure of Merit of the Raman gain fiber is at least about 10 $W^{-1}$ at the pump wavelength (e.g. 1457 nm). In especially desirable embodiments of the present invention, the Raman Figure of Merit of the Raman gain fiber is at least about 18 $W^{-1}$ at the pump wavelength (e.g. 1457 nm).

In operation, a weak, broadened input optical signal 36 enters the device at input 22, is amplified and compressed in dispersion compensating fiber 26, is further amplified in Raman gain fiber 28, and exits the device as an amplified, compressed output optical signal 38. The skilled artisan may select appropriate lengths and properties of the dispersion compensating fiber 26 and the Raman gain fiber to provide both a desired dispersion compensation and a desired gain. The Raman gain fiber may have negative or positive dispersion; the skilled artisan will take into account any dispersion of the Raman gain fiber in designing the device.

In order to simplify the interplay between the dispersion of the dispersion compensating fiber and of the Raman gain fiber, it may be desirable for the Raman gain fiber to have a dispersion slope of between about −0.05 ps/nm²/km and about 0.05 ps/nm²/km over a wavelength range of about 1555 nm to about 1615 nm. It may also be desirable for the Raman gain fiber to have a dispersion of more positive than about −25 ps/nm/km over a wavelength range of about 1555 nm to about 1615 nm. Further, in order to suppress the effects of four-wave mixing resulting from high power pumping over a broad wavelength range, it may be desirable for the Raman gain fiber to have a moderate dispersion at the pump wavelength (e.g. absolute value between about 15 ps/nm/km and about 25 ps/nm/km). It is also desirable for the Raman gain fiber to have a zero-dispersion wavelength at least 50 nm greater than the pump wavelength. In especially desirable embodiments of the present invention, the Raman gain fiber has a zero-dispersion wavelength at least 100 nm greater than the pump wavelength. For example, suitable Raman gain fibers may have zero-dispersion wavelength of at least about 1580 nm. Especially suitable Raman gain fibers have a core-to-cladding deltas of at least about 1.8%, and core radii of between about 1.8 μm and about 2.4 μm. One example of a suitable Raman gain fiber is described below in more detail in connection with FIG. 7.

Figure 2:
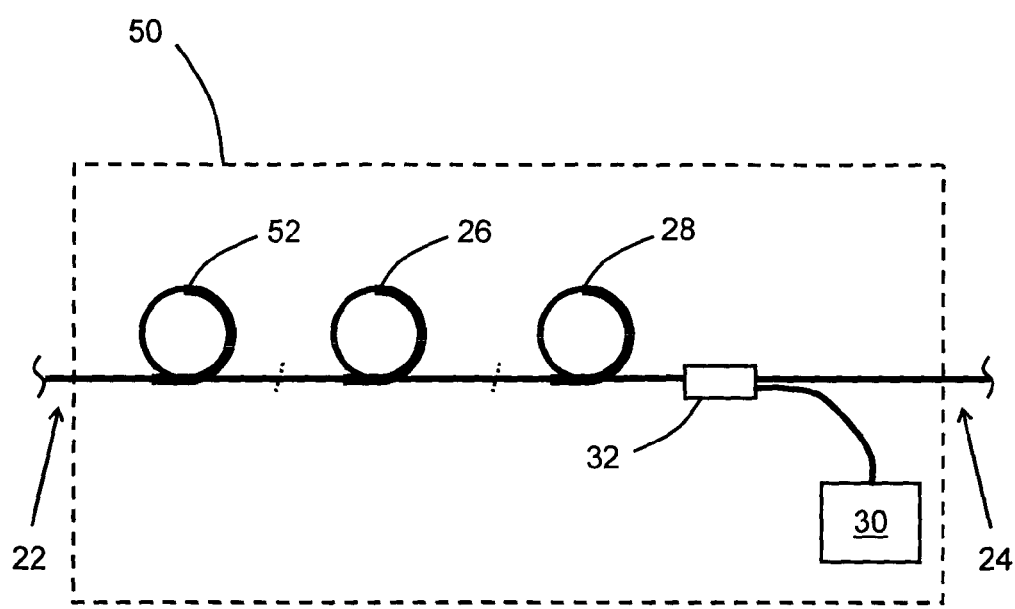
FIG. 2 is a schematic view of a dispersion compensating device according to one embodiment of the present invention.

Another embodiment of the present invention is shown in schematic view in FIG. 2. The dispersion compensating device 50 includes an input 22, and output 24, a dispersion compensating fiber 26, and a Raman gain fiber 28 substantially as described above in connection with FIG. 1. The dispersion compensating device 50 further comprises a trim fiber 52 having substantially different dispersion properties (e.g. dispersion and/or dispersion slope) than the dispersion compensating fiber 26 and the Raman gain fiber 28. The use of the trim fiber allows the skilled artisan to maximize the compensation of the dispersion and dispersion slope of a transmission link in cases when the dispersion compensating fiber and Raman gain fiber are unable to do so alone. The trim fiber may have, for example, a positive dispersion (e.g. greater than about 8 ps/nm/km) and a positive dispersion slope (e.g. between about 0 ps/nm²/km and about 0.15 ps/nm²/km). The trim fiber need not provide Raman gain, and need not be operatively coupled to the pump laser. For example, SMF-28® (available from Corning Incorporated of Corning, N.Y.), which provides very little Raman gain, can be used as the trim fiber. In certain embodiments of the invention, however, the trim fiber may provide Raman gain, and may be coupled to the pump laser. Use of a trim fiber for residual dispersion trimming is described, for example, in U.S. patent application Ser. No. 10/113,448, which is incorporated herein by reference. In the embodiment of the invention shown in FIG. 2, the trim fiber 52 is at the input of the device, the Raman gain fiber 28 is at the output of the device, and the dispersion compensating fiber 26 is between the trim fiber and the Raman gain fiber.

The present invention is especially useful when the dispersion compensating device is designed to compensate a relatively short span of transmission fiber, and therefore has a relatively short length of dispersion compensating fiber. In advantageous embodiments of the present invention, the dispersion compensating fiber has a length of less than about 3 km. In especially advantageous embodiments of the present invention, the dispersion compensating fiber has a length of less than about 2 km.

As described above, the dispersion compensating devices of the present invention may be Raman pumped to provide gain. The skilled artisan will appreciate that a pump laser may be configured to provide co-pumping, counterpumping or co-counterpumping of the Raman gain fiber and the dispersion compensating fiber. The gain will depend on the properties of the dispersion compensating fiber and the Raman gain fiber, the lengths of the dispersion compensating fiber and the Raman gain fiber, and the wavelength and power of the pump signal.

Figure 3:
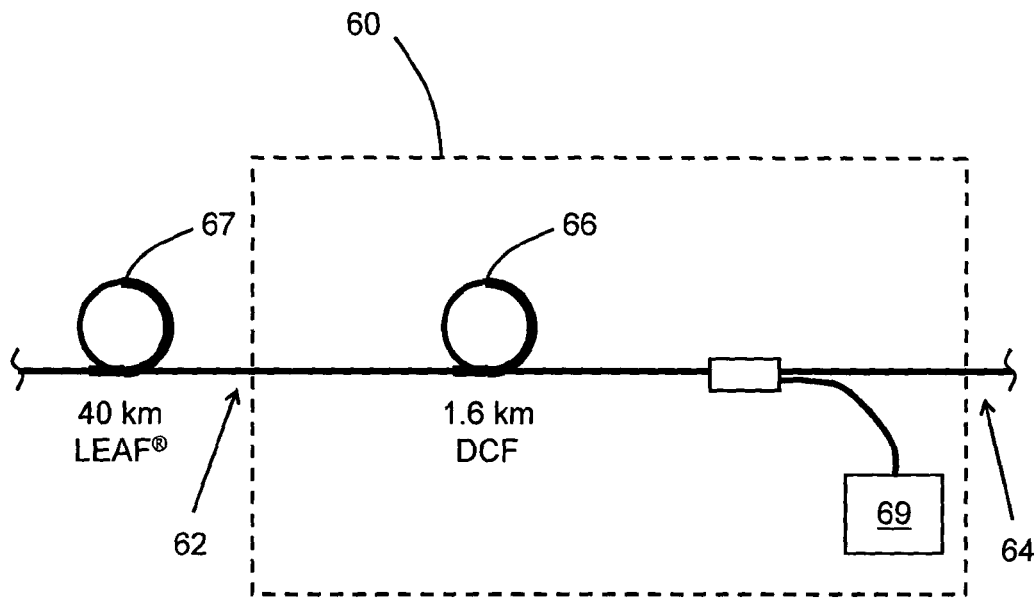
FIG. 3 is a schematic view of a conventional Raman-pumped dispersion compensating device.
Figure 4:
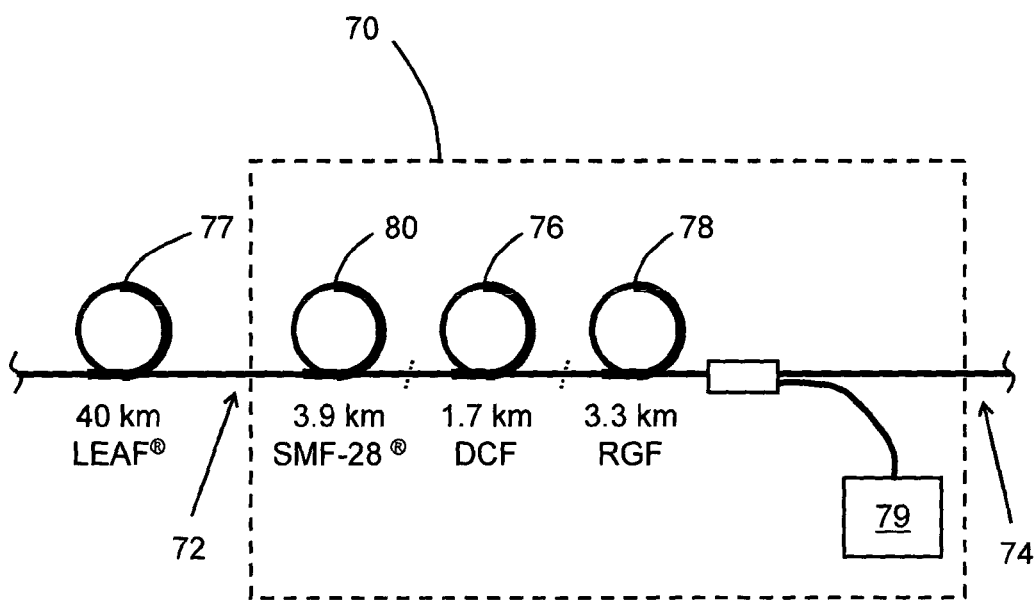
FIG. 4 is a schematic view of a Raman-pumped dispersion compensating device according to the present invention.

FIG. 3 is a schematic diagram of a conventional device suitable for compensating the dispersion of a span of 40 km of LEAF® optical fiber, available from Corning Incorporated of Corning, N.Y. The conventional device 60 includes an input 62, and output 64, and a 1.6 km length of a suitable dispersion compensating fiber 66 coupling the input to the output. The dispersion compensating fiber is operatively coupled to a pump laser 69 operating in the 1430–1480 nm wavelength range. The 40 km span of LEAF® δ is coupled to the input 62 of the device. FIG. 4 is a schematic diagram of an example of a device suitable for compensating the dispersion of a span of 40 km of LEAF® according to the present invention. Device 70 includes input 72, output 74, with 1.7 km of the dispersion compensating fiber 76, 3.3 km of the Raman gain fiber 78 described below in connection with FIG. 7, and 3.9 km of single mode fiber 80 (SMF-28®) connected in series between the input and the output. The Raman gain fiber is described in more detail hereinbelow. The dispersion compensating fiber and the Raman gain fiber are operatively coupled to a pump laser 79 operating in the 1430–1480 nm window. The 40 km span of LEAF® 77 is coupled to the input 72 of the device. Table 1 shows the dispersion properties of LEAF®, SMF-28®, and the dispersion compensating fiber (DCF) and Raman gain fiber (RGF) used in the examples of FIGS. 3 and 4 over a wavelength range of 1555 nm–1615 nm.

TABLE 1

Dispersion values (in ps/nm/km) for optical fibers

| | 1555 nm | 1565 nm | 1575 nm | 1585 nm | 1595 nm | 1605 nm | 1615 nm |
|---|---|---|---|---|---|---|---|
| LEAF® | 5.0 | 5.8 | 6.7 | 7.5 | 8.4 | 9.2 | 10.1 |
| DCF | −124.3 | −141.6 | −161.4 | −183.5 | −207.2 | −231.5 | −254.8 |
| RGF | −17.2 | −16.8 | −16.5 | −16.1 | −15.7 | −15.4 | −15.0 |
| SMF-28® | 16.4 | 17.0 | 17.6 | 18.1 | 18.7 | 19.2 | 19.8 |

Figure 5:
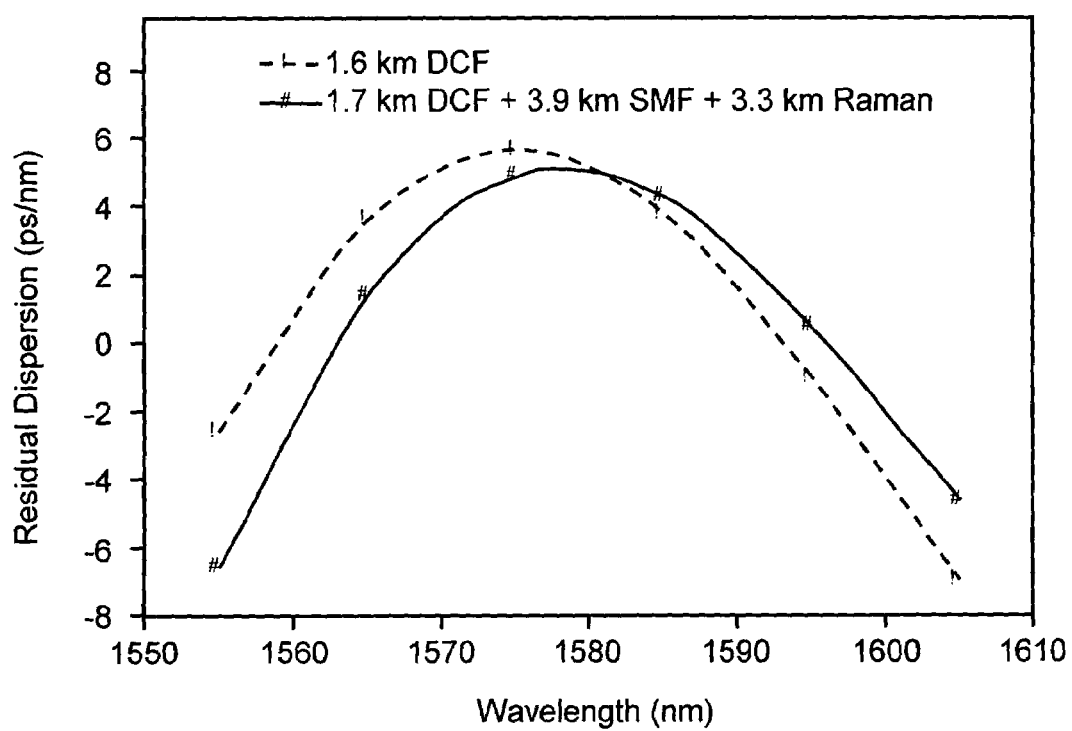
FIG. 5 is a graph of residual dispersion vs. wavelength for the devices of FIG. 3 and FIG. 4.

FIG. 5 shows the calculated residual dispersion of the 1555–1615 wavelength band after propagation through 40 km of LEAF® and the devices of FIG. 3 and FIG. 4. The conventional device 60 and the device 70 of the present invention both provide adequate dispersion compensation. Due to its additional length of Raman gain fiber, the device 70 of the present invention can provide at least about three times as much Raman gain as does the conventional device 60.

In selecting lengths of dispersion compensating fibers, trim fibers, and Raman gain fibers for use in the present invention, the skilled artisan may wish to use numerical optimization of the residual dispersion of the transmission link-dispersion compensating device pair. In order to maximize the dispersion compensation, it is desirable to minimize the sum of the dispersion of the transmission link and the dispersion of the dispersion compensating device:

$$L_T \cdot D_T(\lambda) + L_{DCF} \cdot D_{DCF}(\lambda) + L_{RGF} \cdot D_{RGF}(\lambda) + L_{TF} \cdot D_{TF}(\lambda) \approx 0 \text{ ps/nm/km}$$

where $L_T$, $L_{DCF}$, $L_{RGF}$ and $L_{TF}$ are the lengths of the transmission fiber, the dispersion compensating fiber, the Raman gain fiber, and the trim fiber, respectively, and $D_T(\lambda)$, $D_{DCF}(\lambda)$, $D_{RGF}(\lambda)$, and $D_{TF}(\lambda)$ are the dispersions per unit length as a function of wavelength. The Raman gain of the device may be chosen by selecting the sum of the lengths of the dispersion compensating fiber and the Raman gain fiber ($L_{DCF} + L_{RGF}$). In desirable embodiments of the present invention, the absolute value of the residual dispersion is less than about 10% of the absolute value of the dispersion caused by the length of transmission fiber over a wavelength range of about 1555 nm to about 1615 nm. In especially desirable embodiments of the present invention, the absolute value of the residual dispersion is less than about 5% of the absolute value of the dispersion caused by the length of transmission fiber over a wavelength range of about 1555 nm to about 1615 nm. For example, in the example of FIGS. 4 and 5, the 40 km of LEAF® causes a dispersion of about 200 ps/nm at 1555 nm, and about 404 ps/nm at 1615 nm. The absolute value of the residual dispersion at 1555 nm after propagation through the device of FIG. 4 is about 7 ps/nm, which is less than about 4% of the dispersion caused by the length of LEAF®. The absolute value of the residual dispersion at 1615 nm is about −5 ps/nm, which is less than 2% of the dispersion caused by the length of LEAF®.

For use in the field, it may be desirable for the dispersion compensating devices of the present invention to include an enclosure for the optical fibers. The dispersion compensating fiber, Raman gain fiber, and (if used) trim fiber are connected in series inside the enclosure. The pump source may be included in the enclosure, or may be in a separate enclosure.

Figure 6:
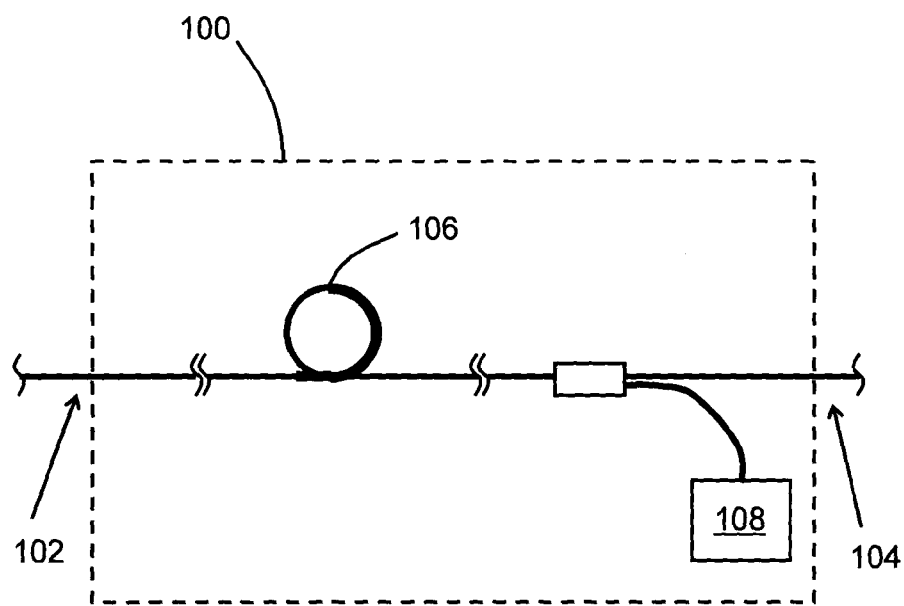
FIG. 6 is a schematic view of a Raman amplification device according to one embodiment of the present invention.
Figure 7:
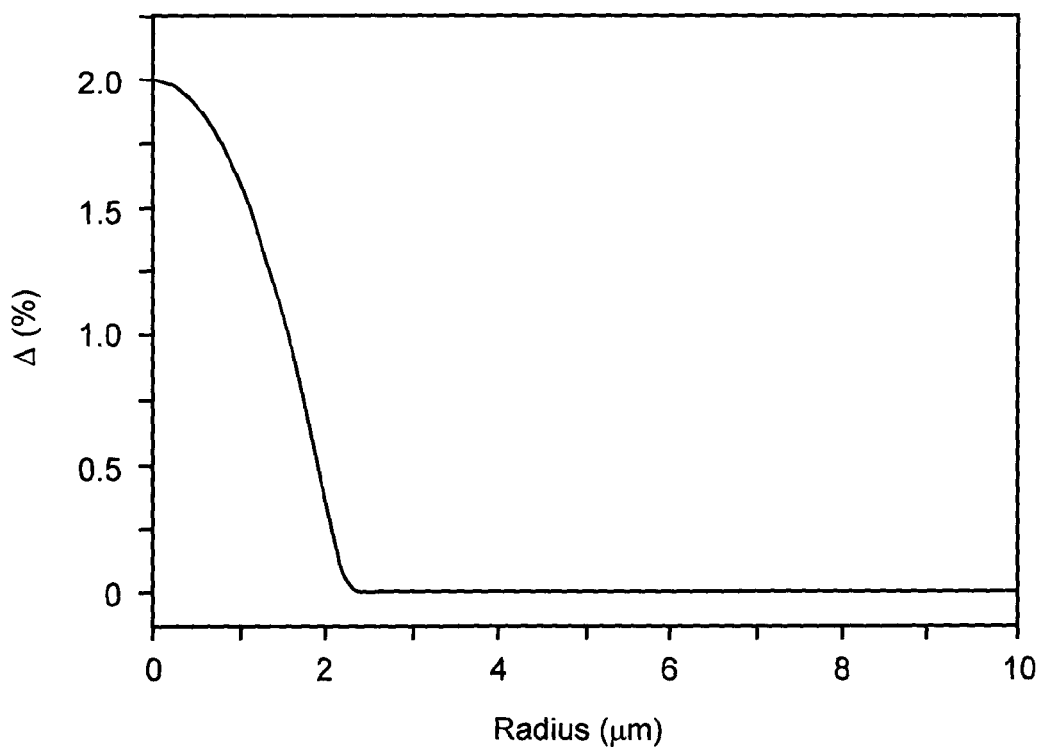
FIG. 7 is a profile of a Raman gain fiber according to one embodiment of the present invention.

Another aspect of the present invention provides a Raman gain fiber suitable for use in Raman amplifiers and in Raman-pumped dispersion compensating devices. According to one embodiment of the invention, shown in schematic view in FIG. 6, a Raman amplification device 100 having an input 102 and an output 104 includes a length of a Raman gain fiber 106 between the input and the output, and a pump laser 108 operatively coupled to the Raman gain fiber. The Raman gain fiber 106 has a germania-doped silica core having an α-profile with an α of between about 1.5 and about 3, and a peak core Δ of at least about 1.8%. An example of a Raman gain fiber profile according to this embodiment of the invention is shown in FIG. 7. The core radius is between about 1.8 and about 2.4 microns. In desirable embodiments of the invention, the cladding has a substantially uniform refractive index within about 20 microns of the core, as shown in FIG. 7.

In order to provide increased Raman gain, it is desirable for the Raman gain fiber to have an effective area of no greater than about 19 μm² at a wavelength of 1450 nm, and a Raman figure of merit of at least about 18 $W^{-1}$ at 1457 nm. Desirable Raman gain fibers have low attenuation losses at both the pump and signal wavelengths (e.g. less than about 0.8 dB/km at both 1450 nm and 1550 nm). In order to suppress the effects of four wave mixing in the wavelength range of the pump laser, it is desirable for the Raman gain fiber to have a moderate negative dispersion (e.g. between about −25 ps/nm/km and about −15 ps/nm/km at a wavelength of 1450 nm) and a low positive dispersion slope (e.g. between about 0 ps/nm²/km and about 0.05 ps/nm²/km at a wavelength of 1450 nm).

As will be evident to the skilled artisan, the Raman gain fiber of the present invention may be pumped using any appropriate pumping scheme. For example, the Raman gain fiber may be co-pumped, counterpumped, or co-counter-pumped. A WDM coupler may be used to introduce the pump signal into the Raman gain fiber. The Raman gain fiber and the pump laser may be arranged inside an enclosure for use in the field.

A Raman gain fiber having the index profile of FIG. 7 was fabricated using standard OVD techniques. The properties of this fiber are shown in Table 2.

TABLE 2

Properties of an example of a Raman gain fiber

| Property | Value |
|---|---|
| Dispersion at 1450 nm | −21.6 ps/nm/km |
| Dispersion at 1550 nm | −17.2 ps/nm/km |
| Dispersion slope at 1450 nm | 0.043 ps/nm2/km |
| Dispersion slope at 1550 nm | 0.042 ps/nm2/km |
| Effective area at 1450 nm | 15.3 μm² |
| Effective area at 1550 nm | 17.5 μm² |
| Mode field diameter at 1450 nm | 4.41 μm |
| Mode field diameter at 1550 nm | 4.72 μm |
| Attenuation at 1450 nm | 0.595 dB/km |
| Attenuation at 1550 nm | 0.458 dB/km |
| Single mode cutoff | 1146 nm |

TABLE 2-continued

Properties of an example of a Raman gain fiber

| Property | Value |
|---|---|
| Polarization mode dispersion | 0.033 ps/$\sqrt{km}$ |
| Raman Figure of Merit (1457 nm pump wavelength) | 24.0 W$^{-1}$ |

As will be evident to the skilled artisan, the Raman gain fiber of the present invention may be pumped using any appropriate pumping scheme. For example, the Raman gain fiber may be co-pumped, counterpumped, or co-counterpumped. The Raman gain fiber according to this aspect of the invention is particularly useful in the dispersion compensating devices described hereinabove.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A dispersion compensating device having an input and an output, the device comprising:
    a dispersion compensating fiber having a dispersion more negative than −100 ps/nm/km over a wavelength range situated at within 1555 nm to 1615 nm;
    a Raman gain fiber having a dispersion more positive than −40 ps/nm/km over said wavelength range; and
    a pump source operatively coupled to the dispersion compensating fiber and the Raman gain fiber, the pump source operating at a pump wavelength, wherein the dispersion compensating fiber has a Raman Figure of Merit at the pump wavelength, and
    wherein the Raman gain fiber has a Raman Figure of Merit at least equivalent to the Raman Figure of Merit of the dispersion compensating fiber, and wherein the dispersion compensating fiber and the Raman gain fiber are arranged in series between the input and the output of the device.

2. A dispersion compensating device having an input and an output, the device comprising:
    a dispersion compensating fiber having a dispersion more negative than −50 ps/nm/km over a wavelength range of 1555 nm to 1615 nm;
    a Raman gain fiber having a dispersion more positive than −40 ps/nm/km over a wavelength range of 1555 nm to 1615 nm; and
    a pump source operatively coupled to the dispersion compensating fiber and the Raman gain fiber, the pump source operating at a pump wavelength, wherein the dispersion compensating fiber has a Raman Figure of Merit at the pump wavelength, and
    wherein the Raman gain fiber has a Raman Figure of Merit at least equivalent to the Raman Figure of Merit of the dispersion compensating fiber, and wherein the dispersion compensating fiber and the Raman gain fiber are arranged in series between the input and the output of the device, wherein the Raman gain fiber has a Raman Figure of Merit of at least 10 W$^{-1}$ at the pump wavelength.

3. The dispersion compensating device of claim 1, wherein the Raman gain fiber has a dispersion at the pump wavelength having an absolute value between 15 ps/nm/km and 25 ps/nm/km.

4. The dispersion compensating device of claim 1, wherein the Raman gain fiber has a dispersion slope at the pump wavelength between 0.05 ps/nm$^2$/km and 0.05 ps/nm$^2$/km.

5. The dispersion compensating device of claim 1, wherein the Raman gain fiber has a zero-dispersion wavelength at least 50 nm greater than the pump wavelength of the pump source.

6. The dispersion compensating device of claim 1, wherein the Raman gain fiber has a core-to-cladding delta of at least 1.8%, and a core radius of between 1.8 µm and 2.4 µm.

7. The dispersion compensating device of claim 1, wherein the dispersion compensating fiber has a dispersion slope more negative than −1.5 ps/nm$^2$/km at 1575 nm.

8. The dispersion compensating device of claim 1, wherein the dispersion compensating fiber has a length of less than 3 km.

9. The dispersion compensating device of claim 1, further comprising:
    a trim fiber having different dispersion properties than the dispersion compensating fiber and the Raman gain fiber, the trim fiber being arranged in series with the dispersion compensating fiber and the Raman gain fiber between the input and the output of the device.

10. The dispersion compensating device of claim 9, wherein the trim fiber has a dispersion more positive than 8 ps/nm/km over a wavelength range of 1555 nm to 1615 nm.

11. The dispersion compensating device of claim 9, wherein the trim fiber has a dispersion slope between 0 ps/nm$^2$/km and 0.15 ps/nm$^2$/km.

12. The dispersion compensating device of claim 9, wherein a length of transmission fiber is coupled to the input of the device, and wherein the properties and lengths of the dispersion compensating fiber, the trim fiber, and the Raman gain fiber are selected such that the absolute value of the residual dispersion is less than 10% of the absolute value of the dispersion caused by the length of transmission fiber over a wavelength range of 1555 nm to 1615 nm.

13. The dispersion compensating device of claim 1, further comprising an enclosure, wherein the dispersion compensating fiber and the Raman gain fiber are connected in series inside the enclosure.

14. The dispersion compensating device of claim 2, wherein the dispersion compensating fiber has a length of less than 3 km.

15. The dispersion compensating device according to claim 2 wherein said Raman gain fiber has a dispersion between −25 ps/nm/km and −15 ps/nm/km and a dispersion slope between 0 ps/nm$^2$/km and 0.05 ps/nm$^2$/km.

* * * * *